US009521649B2

(12) United States Patent
Shimizu et al.

(10) Patent No.: US 9,521,649 B2
(45) Date of Patent: Dec. 13, 2016

(54) IN-VEHICLE APPARATUS AND DISPLAY CONTROL SYSTEM FOR THE SAME (71) Applicant: Clarion Co., Ltd., Saitama-shi, Saitama (JP)

(72) Inventors: Atsushi Shimizu, Yokohama (JP); Yasushi Nagai, Yokohama (JP); Takashi Matsumoto, Kawasaki (JP); Koichi Mitsui, Koshigaya (JP); Hiroyoshi Endo, Kawaguchi (JP); Tatsuaki Osafune, Kawasaki (JP)

(73) Assignee: Clarion Co., Ltd., Saitama-shi (JP)

( * ) Notice: Subject to any disclaimer, the term of this patent is extended or adjusted under 35 U.S.C. 154(b) by 120 days.

(21) Appl. No.: 13/744,754

(22) Filed: Jan. 18, 2013

(65) Prior Publication Data
US 2014/0038669 A1 Feb. 6, 2014

(30) Foreign Application Priority Data

Feb. 22, 2012 (JP) ................. 2012-036528

(51) Int. Cl.
*H04W 68/00* (2009.01)
*G06F 3/14* (2006.01)
*H04L 29/08* (2006.01)
*G09G 5/00* (2006.01)

(52) U.S. Cl.
CPC ............ *H04W 68/00* (2013.01); *G06F 3/14* (2013.01); *G09G 5/005* (2013.01); *H04L 67/12* (2013.01); *G06F 3/1423* (2013.01); *G09G 2380/10* (2013.01)

(58) Field of Classification Search
CPC .. G06F 9/541; G06F 9/45512; H04N 21/4122; H04N 21/43635
See application file for complete search history.

(56) References Cited

U.S. PATENT DOCUMENTS

2003/0145283 A1* 7/2003 Machida et al. .............. 715/513
2005/0266879 A1* 12/2005 Spaur et al. ................ 455/556.2
2006/0161344 A1* 7/2006 Iwahori et al. ............... 701/211
(Continued)

FOREIGN PATENT DOCUMENTS

JP 2007-060489 A 3/2007
JP 2009-281991 12/2009

OTHER PUBLICATIONS

Brakensiek, Jörg; Terminal Mode Technical Architecture, Release Version 1.0; 2010; pp. 1-94; Nokia Inc. Palo Alto, CA, USA.
(Continued)

*Primary Examiner* — Cindy Trandai
(74) *Attorney, Agent, or Firm* — Foley & Lardner LLP (57) ABSTRACT In a system in which an in-vehicle apparatus and a smartphone are connected to each other, screen display switching cannot be performed with priorities of all the applications taken into account as respective terminals carry applications. A management block is provided in an in-vehicle apparatus or in a smartphone. The management block holds priority definitions for starting and displaying applications on both terminals. In response to external input to both terminals, the management block selects the application to be started and displayed. The management block identifies the terminal carrying the selected application, and transmits to the identified terminal a request to start the application and to switch display output accordingly.

10 Claims, 10 Drawing Sheets (56) References Cited

U.S. PATENT DOCUMENTS

| | | |
|---|---|---|
| 2009/0040381 A1* | 2/2009 | Fukui ............................ 348/554 |
| 2009/0044219 A1* | 2/2009 | Katou et al. .................... 725/37 |
| 2009/0109338 A1* | 4/2009 | Furutani ............ H04N 5/44591 |
| | | 348/565 |
| 2009/0240879 A1* | 9/2009 | Okamoto ..................... 711/113 |
| 2009/0249099 A1 | 10/2009 | Saito |
| 2010/0262673 A1* | 10/2010 | Chang et al. ................. 709/217 |
| 2011/0009107 A1* | 1/2011 | Guba et al. ................... 455/418 |
| 2011/0093161 A1* | 4/2011 | Zhou et al. ..................... 701/33 |
| 2011/0136435 A1 | 6/2011 | Taniguchi |
| 2011/0187939 A1* | 8/2011 | Kurihara ....................... 348/738 |
| 2011/0316868 A1 | 12/2011 | Katou |

OTHER PUBLICATIONS

European Patent Office extended search report on application 13151305.3 dated Jun. 18, 2013; 11 pages.

\* cited by examiner

| | | STATE | IN-VEHICLE APPARATUS SCREEN IS CURRENTLY OUTPUT TO DISPLAY | | SMARTPHONE SCREEN IS CURRENTLY OUTPUT TO DISPLAY | | |
|---|---|---|---|---|---|---|---|
| | EXTERNAL INPUT (EVENT) | | VEHICLE SAFETY COMMUNICATION CURRENTLY ON | VEHICLE STATE WARNING CURRENTLY ON | EMERGENCY INFORMATION CURRENTLY DISPLAYED (EARTHQUAKE EARLY WARNING) | GREEN DRIVING SUPPORT CURRENTLY DISPLAYED | NAVIGATION DISPLAY CURRENTLY ON |
| IN-VEHICLE APPARATUS | MESSAGE RECEIVED | VEHICLE SAFETY COMMUNICATION (TO AVERT COLLISION) | — | 1. VEHICLE SAFETY COMMUNICATION 2. NONE | 1. VEHICLE SAFETY COMMUNICATION 2. IN-VEHICLE APPARATUS SCREEN | 1. VEHICLE SAFETY COMMUNICATION 2. IN-VEHICLE APPARATUS SCREEN | 1. VEHICLE SAFETY COMMUNICATION 2. IN-VEHICLE APPARATUS SCREEN |
| | CAN INFORMATION | VEHICLE STATE WARNING (LOW BATTERY LEVEL) | 1. NONE 2. NONE | — | 1. NONE 2. NONE | 1. VEHICLE STATE WARNING 2. IN-VEHICLE APPARATUS SCREEN | 1. VEHICLE STATE WARNING 2. IN-VEHICLE APPARATUS SCREEN |
| SMARTPHONE | MESSAGE RECEIVED | EMERGENCY INFORMATION (EARTHQUAKE EARLY WARNING) | 1. NONE 2. NONE | 1. EMERGENCY INFORMATION 2. SMARTPHONE SCREEN | — | 1. EMERGENCY INFORMATION 2. NONE | 1. EMERGENCY INFORMATION 2. NONE |
| | CAN INFORMATION | HIGH ENGINE REVOLUTIONS (TO SUPPORT GREEN DRIVING) | 1. NONE 2. NONE | 1. NONE 2. NONE | 1. NONE 2. NONE | — | 1. GREEN DRIVING SUPPORT 2. SMARTPHONE SCREEN |
| | USER'S OPERATION | NAVIGATION SYSTEM OPERATED | 1. NONE 2. NONE | 1. NONE 2. NONE | 1. NONE 2. NONE | 1. NAVIGATION SYSTEM 2. IN-VEHICLE APPARATUS SCREEN | — |

42: 1. APPLICATION TO BE ENABLED  2. OUTPUT SCREEN

FIG. 5

| | TYPE OF TERMINAL CARRYING APPLICATION 51 | | CONDITIONS FOR PERMITTING STARTUP 54 | |
|---|---|---|---|---|
| APPLICATION NAME | IN-VEHICLE APPARATUS | SMARTPHONE | IN-VEHICLE APPARATUS CURRENTLY CONNECTED WITH SMARTPHONE 53 | VEHICLE SPEED PULSES DETECTED 52 |
| VEHICLE SAFETY COMMUNICATION (TO AVERT COLLISION) | ○ | — | ○ | — |
| EMERGENCY INFORMATION (EARTHQUAKE EARLY WARNING) | — | ○ | ○ | — |
| VEHICLE STATE WARNING | ○ | — | ○ | — |
| REAR VIEW MONITOR | ○ | — | ○ | ○ |
| GREEN DRIVING SUPPORT | — | ○ | ○ | — |
| DVD PLAYER | ○ | — | ○ | × |
| ⋮ | ⋮ | ⋮ | ⋮ | ⋮ |

FIG. 10 ively distracting the driver's attention# IN-VEHICLE APPARATUS AND DISPLAY CONTROL SYSTEM FOR THE SAME The present application claims priority from Japanese application serial No. 2012-036528, filed on (Feb. 22, 2012), the content of which is hereby incorporated by reference into this application.

BACKGROUND OF THE INVENTION

1. Field of the Invention

This invention relates to a technique for controlling mobile terminals such as a car navigation system and a mobile phone.

2. Description of the Related Art

In-vehicle apparatuses have been evolving in functionality. One example of the in-vehicle apparatuses is a navigation terminal that is not only furnished with the navigation function but has also been supplemented with such additional functions as television, DVD reproduction, hands-free telephone calls, rear view monitoring, and telematics. Also, there is a trend in which the in-vehicle apparatus is coupled with a highly functional mobile phone (called the smartphone hereunder) so that the in-vehicle apparatus may utilize the functions of the smartphone.

Car navigation equipment (called the car navigation system hereunder) is required to be highly safe and convenient when presenting the driver with video and audio information.

With regard to safety, the car navigation system has the disadvantage of potentially distracting the driver's attention while being operated. For this reason, the car navigation system generally has the function of restricting TV viewing and inhibiting its navigation operation menu with hatching or the like while the vehicle is traveling.

With regard to convenience, the car navigation system generally has the function of muting music reproduction upon receipt of a telephone call and enabling a hands-free call. That is, the car navigation system is required to control its functions in keeping with system and vehicle state at any point in time.

Japanese Unexamined Patent Publication No. 2007-60489 discloses a method which, if emergency information is issued during a digital broadcast from a broadcast station, involves supplying a data broadcast about the emergency information received through the digital broadcast to the car navigation system that in turn outputs the supplied data broadcast to its monitor. This patent document also discloses a method for switching the output screen of the monitor from an in-vehicle apparatus screen to a data broadcast screen.

Jorg Brakensiek, "Terminal Mode Technical Architecture Release Version 1.0", 2010, [searched online on Jul. 19, 2011 at <URL: http://www.terminalmode.org/files/Zipped_Release.zip> describes a method for coupling the in-vehicle apparatus with the smartphone in wired or wireless fashion so that the smartphone may be operated through a user interface of the in-vehicle apparatus, with the screen of the smartphone output to the display of the in-vehicle apparatus.

SUMMARY OF THE INVENTION

The in-vehicle apparatus is required to provide screen output that is highly safe and convenient. Regardless of the user's intention, when the information output by a specific function of the in-vehicle apparatus is to be provided, the apparatus needs to offer the screen output corresponding to that function; when the information output by a particular function of the smartphone is to be provided, the in-vehicle apparatus needs to let its display screen present the smartphone screen output.

That is, when either the in-vehicle apparatus or the smartphone has detected the input of an external event such as a user's operation, reception of CAN (Controller Area Network; an in-vehicle equipment connection standard) information, or receipt of a message, it is necessary to provide screen control by determining the kind of screen to be output in accordance with the type of the event, operating state of the functions incorporated in both terminals, and screen display state.

Japanese Unexamined Patent Publication No. 2007-60489 and Jorg Brakensiek, "Terminal Mode Technical Architecture Release Version 1.0", 2010, [searched online on Jul. 19, 2011 at <URL: http://www.terminalmode.org/files/Zipped_Release.zip> do not disclose techniques for solving such problems. There has been a need for a screen control method that provides higher safety and more convenience than ever.

This invention provides a display control system including a first terminal (e.g., in-vehicle apparatus system as car navigation equipment) and an apparatus (e.g., highly functional mobile phone) coupled with the first terminal offering higher safety and more convenience than before. The invention further provides the first terminal (e.g., in-vehicle apparatus system as car navigation equipment) for use with the inventive display control system.

More specifically, according to one aspect of this invention, there is provided a display control system including a first terminal and a second terminal coupled with each other. Each of the first and the second terminals includes a processing block which implements a function provided by each of the terminals, and a function control block which outputs display information based on a result of processing by the processing block. The first terminal includes a display control block which displays as valid display information, on a screen of the first terminal, the display information output either by the first terminal or by the second terminal based on the result of the processing. Either the first terminal or the second terminal includes a management block which, upon receipt of a new event either by the first terminal or by the second terminal from the outside thereof, determines whether or not to switch to the display information output by one of the processing blocks in charge of processing the new event based on the result of the processing of the new event, as new valid display information. The management block further instructs the display control block possessed by the first terminal to perform the switching if the management block determines that the switching is to be performed.

Preferably in the display control system, upon receipt of the event, the first or the second terminal may notify management block of the receipt of the event. Upon notification of the receipt of the event from the first or the second terminal, the management block may determine which of the processing blocks is to take charge of the processing of the event. The management block may then give notification of the receipt of the event to the function control block of either the first or the second terminal having the processing block in charge of the processing of the event.

Preferably in the display control system, if the processing block in charge has yet to be started, the function control block of each terminal may start the processing block in charge.

Preferably, the management block of the terminal may hold a list of the processing blocks possessed by the first and the second terminals, and also hold definitions for enabling the processing blocks corresponding to the list and for controlling screen switching corresponding thereto.

Preferably, the display control system may further include a server apparatus coupled with the first and the second terminals. Upon startup, the management block may detect the processing blocks incorporated in the first and the second terminals. The management block may prepare a list reflecting the incorporated processing blocks and transmit the list to the server apparatus. The management block may acquire from the server apparatus definitions for enabling the processing blocks corresponding to the list and for controlling screen switching corresponding thereto.

Preferably, upon detecting that either the first or the second terminal has added any processing block or has deleted any of the processing blocks, the management block may update the list to reflect the added or deleted processing blocks and transmit the updated list to the server apparatus. The management block may acquire from the server apparatus the definitions for enabling the new processing blocks corresponding to the updated list and for controlling screen switching corresponding thereto.

Preferably, the event received by the terminal from the outside may be at least one of an operation performed by a user, vehicle information, and a message received via a communication link.

Preferably, the management block of the terminal may manage definitions for either enabling or disabling a group of the processing blocks in accordance with a state of coupling with another terminal and with a traveling state of the vehicle incorporating the display control system. The management block may select a group of the processing blocks that can be enabled based on the definitions for the enabling or the disabling, on the state of coupling with the other terminal, and on the traveling state of the vehicle incorporating the display control system. The management block may then display on the screen an interface for enabling the selected group of the processing blocks.

According to the embodiment of the invention outlined above, upon detection of an external input by the in-vehicle apparatus or by the apparatus coupled therewith, either the screen of the external equipment or the screen of the in-vehicle apparatus is enabled and screen display is switched accordingly. This makes it possible to provide higher safety and more convenience than before.

According to this invention, it is thus possible to provide a screen control system offering higher safety and more convenience and a terminal for use with that system.

DETAILED DESCRIPTION

Some preferred embodiments of this invention are explained below.

First Embodiment

Configuration Diagram 1

Figure 1:
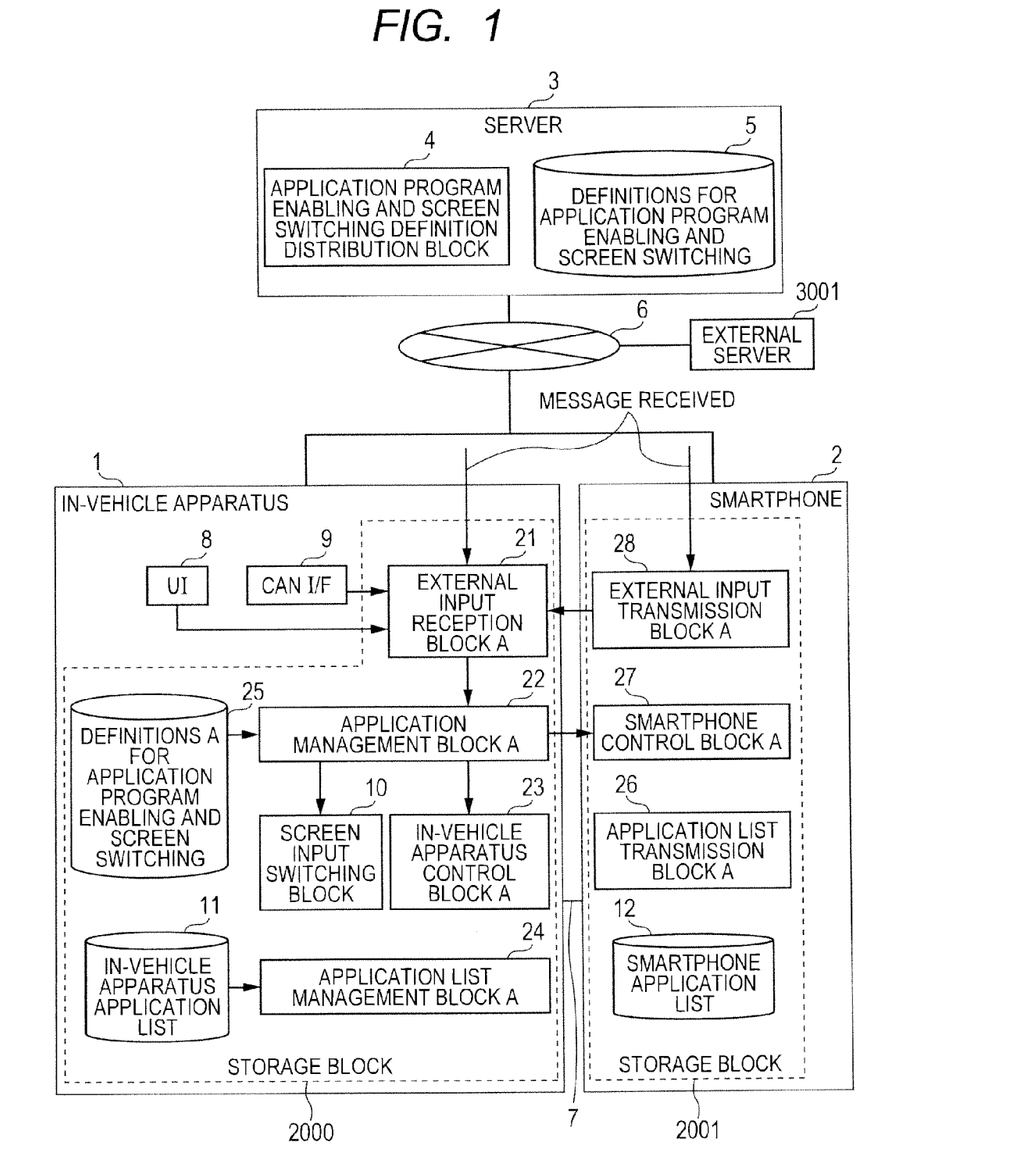
FIG. 1 is a block diagram showing a typical configuration of a display control system and a terminal as a first embodiment.

FIG. 1 is an overall configuration diagram of a display control system as the first embodiment. This system is configured to include an in-vehicle apparatus 1, an information processing terminal 2 having a communication function, and a server 3. The in-vehicle apparatus 1 may be a car navigation system, for example. The information processing terminal 2 having the communication function may be a highly functional mobile phone (called the smartphone hereunder), or an information processing apparatus with a communication function (e.g., a personal computer or a tablet terminal), for example. In the ensuing description of the first embodiment and in the drawings associated therewith, the information processing terminal 2 will be referred to as the smartphone 2.

The functions offered by the in-vehicle apparatus 1 and smartphone 2 are brought about by processing blocks implemented through execution of application programs carried by these apparatuses.

Figure 9:
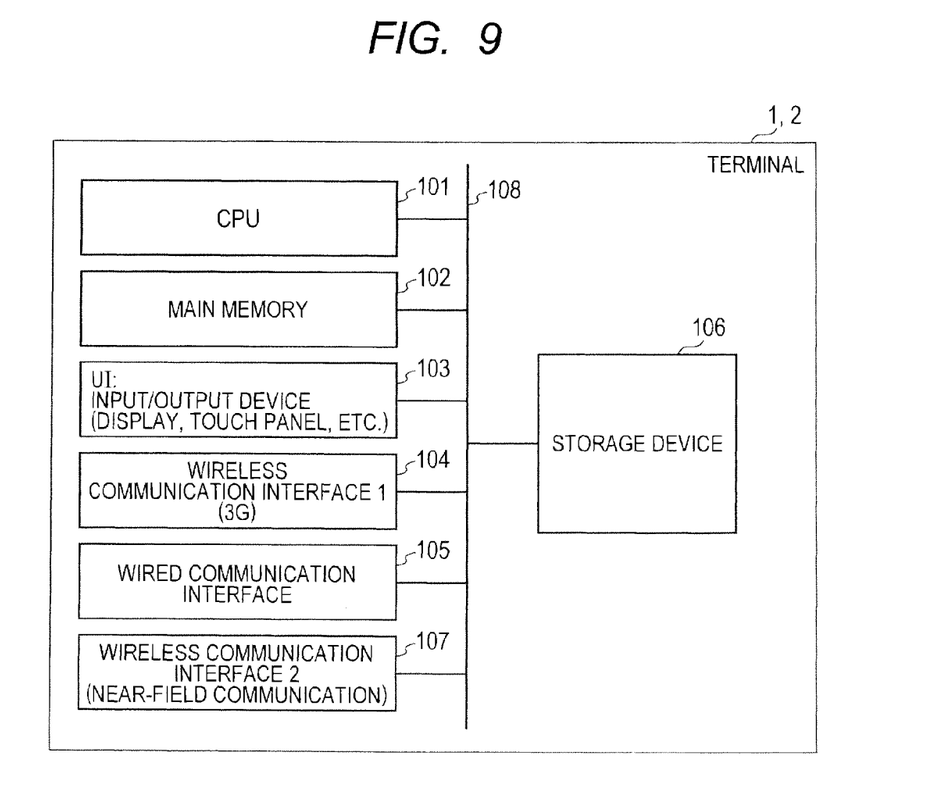
FIG. 9 is a schematic view showing a typical hardware configuration of the display control system and terminal embodying this invention.

The in-vehicle apparatus 1 and smartphone 2 each include, as shown in FIG. 9, a CPU 101, a main memory 102, an input/output device 103 (display, speakers, touch panel, keyboard, etc.) for input/output of information from/to viewers and users, a wireless communication interface 1(104) typically for 3G communication, a near-field wireless communication interface 2(107) such as Bluetooth (registered trademark) for wirelessly communicating with an external apparatus via a network 1, and a wired communication interface 105 such as USB for communicating in wired fashion with an external apparatus via the network 7. These functions may be implemented on a computer coupled with the apparatuses via an internal communication line 108 such as a bus.

The CPU 101 implements processing blocks for performing diverse processes with this embodiment by loading programs from a storage device 106 into the main memory 102 and by executing the loaded programs. The programs and the data for use therewith may be stored beforehand in the storage device 106, input from a storage medium such as a CD-ROM, or downloaded from another apparatus via the network. Alternatively, the functions implemented by these programs may be realized by dedicated hardware.

As shown in FIG. 1, the in-vehicle apparatus 1 and smartphone 2 are linked to a server 3 via a network 6 such as the Internet. As mentioned above, the in-vehicle apparatus 1 and smartphone 2 are coupled with each other via the wired or wireless network 7 such as USB or Bluetooth (registered trademark).

(In-Vehicle Apparatus 1)

The in-vehicle apparatus 1 includes a user interface (UI) 8, a CAN (Controller Area Network) interface 9, and a storage block 2000. The user interface (UI) 8 includes a touch panel, hardware buttons, a microphone for audio input, a display for screen output, and speakers for audio output. The CAN interface 9 is linked to the CAN and exchanges CAN information therewith.

The storage block 2000 implemented by use of the storage device 106 stores processing programs such as those for implementing an external input reception block A21, an application management block A22, an in-vehicle apparatus control block A23, a screen input switching block 10, and an application list management block A24 of the in-vehicle apparatus 1. Also, the storage block 2000 stores data such as definitions A25 for application program enabling and screen switching, and an in-vehicle apparatus application program list 11 (the application program will be simply referred to as the application hereunder).

The external input reception block A21 receives control information from the user interface (UI) 8 and CAN interface 9.

Also, the external input reception block A21 receives messages from an external server 3001 linked through the wireless communication interface 1(104; for 3G communication, etc.) and the network 6.

Furthermore, the external input reception block A21 receives control instructions from an external terminal such as the smartphone 2 by way of the wired communication interface 105 or wireless communication interface 2(107) over the network 7.

Upon receipt of a message from the external input reception block A21, the application management block A22 references the definitions A25 for application enabling and screen switching to designate the corresponding application, transmits the designation along with the received message to be transferred to the application in question either to the in-vehicle apparatus control block A23 or to a smartphone control block A27 of the smartphone 2, and transmits a screen input switching instruction to the screen input switching block 10 so as to enable the application to display its information.

In accordance with the received instruction, the screen input switching block 10 determines whether the screen of the in-vehicle apparatus 1 or the screen of the smartphone 2 is to be output onto the display and switches display input accordingly. The in-vehicle apparatus control block A23 forwards the message transmitted from the application management block A22 to the designated application of the in-vehicle apparatus 1. If that application has yet to be started, the in-vehicle apparatus control block A23 starts the application in question.

If any application of the in-vehicle apparatus 1 or smartphone 2 is added or any of their applications is deleted, the application list management block A24 prepares an application list for both terminals by merging an in-vehicle apparatus application list 11 listing the application ID's of the applications carried by the in-vehicle apparatus 1, with a smartphone application list 12 transmitted from an application list transmission block A26 of the smartphone 2. The application list management block A24 transmits the prepared list to the server 3 to acquire definitions 5 for application enabling and screen switching and thereby updates the definitions A25 for application program enabling and screen switching.

(Smartphone 2)

The smartphone 2 includes a storage block 2001. The storage block 2001, implemented by use of the storage device 106, stores programs for implementing the processing blocks such as an external input transmission block A28, a smartphone control block A27, and an application list transmission block A26, as well as the smartphone application list 12.

The external input transmission block A28 receives a message such as emergency information via the wireless communication interface 104 and transmits the received event to the external input reception block A21 of the in-vehicle apparatus 1. The application list transmission block A26 transmits the smartphone application list 12 listing the ID's of the applications carried by the smartphone 2, in response to a request from the application list management block A24 of the in-vehicle apparatus 1. The smartphone control block A27 transmits the event (i.e., message) transmitted from the application management block A22 of the in-vehicle apparatus 1 to the designated smartphone application. If the smartphone application in question has yet to be started, the smartphone control block A27 starts that application.

The server 3 includes a storage block (not shown) that stores processing programs such as an application enabling and screen switching definition distribution block 4, and the definitions 5 for application enabling and screen display switching. The definitions 5 for application enabling and screen display switching held by the server 3 are distributed to one or a plurality of in-vehicle apparatuses 1 by the application enabling and screen switching definition distribution block 4 via the network 6. If a new terminal (in-vehicle apparatus 1 or smartphone 2) is added or if any terminal associated with a given terminal is added or deleted, the server 3 likewise distributes the definitions 5 for application enabling application and screen display switching.

===(Switching from the In-Vehicle Screen to the Smartphone Screen)===

Figure 2:
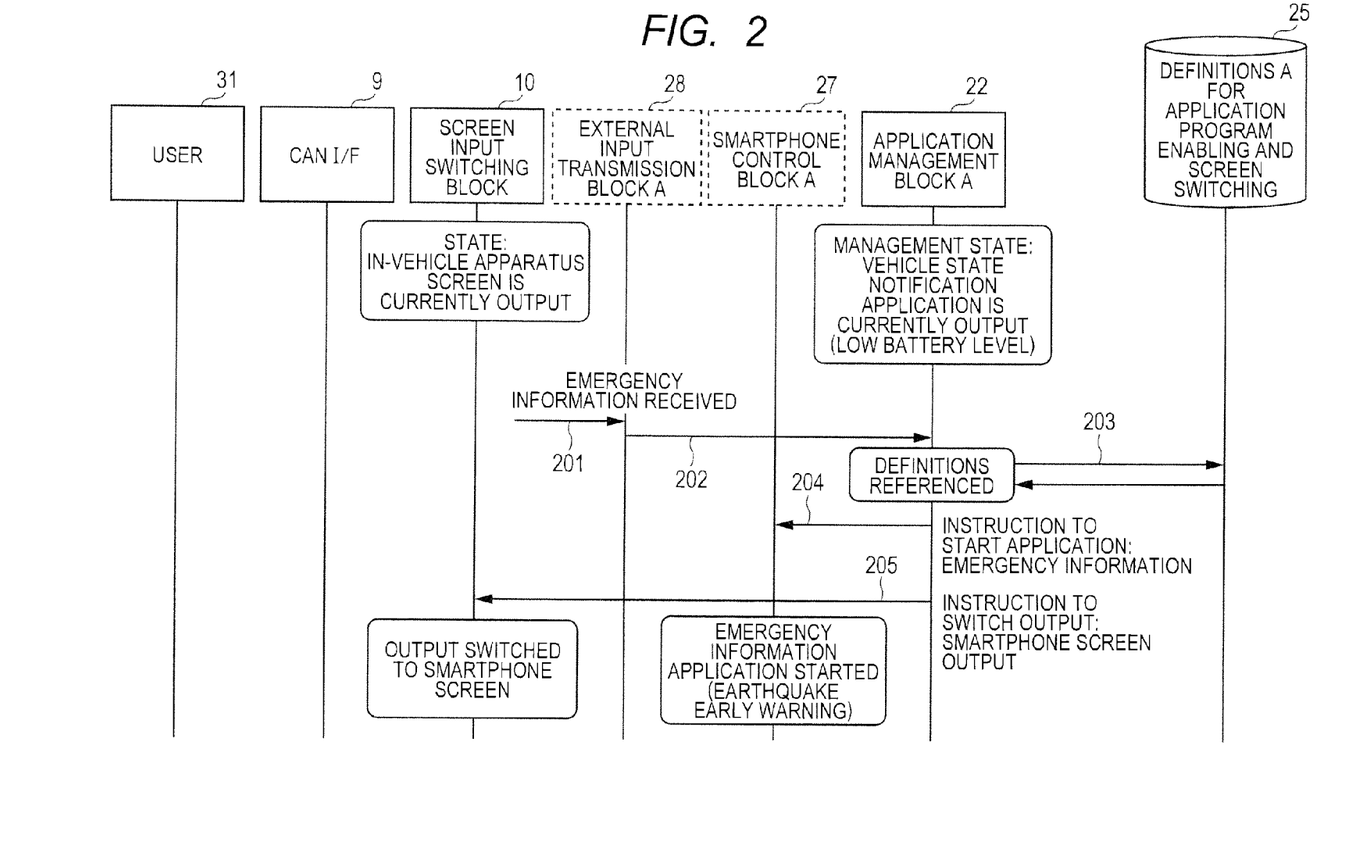
FIG. 2 is a sequence diagram showing the sequence of the first embodiment.

FIG. 2 shows the typical sequence in effect when the in-vehicle apparatus screen currently output is switched to the output of the smartphone screen, in the configuration of FIG. 1 in which the application management block is located in the in-vehicle apparatus 1.

It is assumed here that given an instruction from the application management block A22 of the in-vehicle apparatus 1, the in-vehicle apparatus control block A23 of the in-vehicle apparatus 1 starts a vehicle state notification application and that the screen input switching block 10 outputs the result of the processing by that application to the screen. In this case, the vehicle state notification application implements the function of giving warning against a low battery level or a high water temperature.

The external input transmission block A28 of the smartphone 2 receives emergency information via a mobile phone communication network or the like (201). The emergency information in this case is weather information such as an earthquake early warning or a storm warning.

The external input transmission block A28 transmits the event of emergency information reception (202) to the application management block A22 of the in-vehicle apparatus 1 through a communication channel established by near-field wireless communication as per IEEE 802 or by wired communication such as USB (Universal Serial Bus).

Upon receipt of the incoming event, the application management block A22 references the definitions A25 for application enabling and screen switching, determines that the application whose screen display needs to be enabled is an emergency information application, and identifies the smartphone 2 as the apparatus carrying the application (203).

The application management block A22 transmits the event of emergency information reception to the smartphone control block A27 of the smartphone 2 to the attention of the emergency information application (204), and transmits a smartphone screen output instruction to the screen input switching block 10 (205).

The smartphone control block A27 notifies the emergency information application (or starts it if it has yet to be activated) of the receipt of emergency information, and transmits the result of the processing performed by the application to the screen input switching block 10. In turn, the screen input switching block 10 switches the smartphone screen information output from the emergency information application to display output.

===(Switching from the Smartphone Screen to the In-Vehicle Apparatus Screen)===

Figure 3:
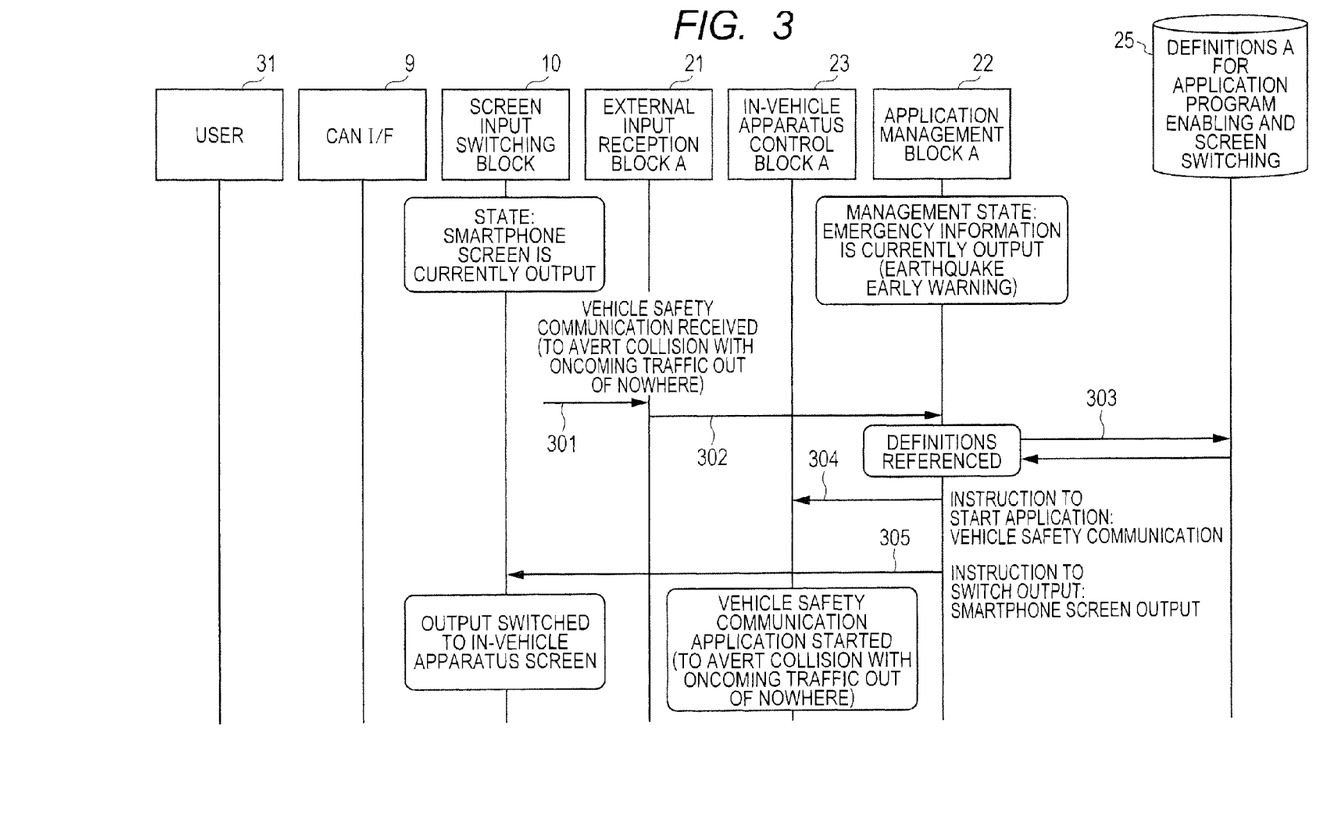
FIG. 3 is another sequence diagram showing the sequence of the first embodiment.

FIG. 3 shows the typical sequence in effect, when the smartphone screen currently output is switched to the output of the in-vehicle apparatus screen, in the configuration of FIG. 1 in which the application management block is located in the in-vehicle apparatus 1.

It is assumed here that the application management block A22 of the in-vehicle apparatus 1 transmits an application enabling instruction to the smartphone control block A27 and that the smartphone control block A27 starts the emergency information application and outputs the result of the processing by that application to the screen. In this case, the emergency information application is an application that implements the function of giving notification of weather information such as an earthquake early warning or a storm warning.

The external input reception block A21 receives a vehicle safety communication (301) and forwards it to the application management block A22 (302). The communication received here is information for averting a rear-end collision or a collision with oncoming traffic out of nowhere.

Upon receipt of the above-mentioned information, the application management block A22 references the definitions A25 for application enabling and screen switching, determines that the application whose screen display needs to be enabled is a vehicle safety communication application, and identifies the in-vehicle apparatus 1 as the apparatus carrying the application in question (303).

The application management block A22 transmits the event of vehicle safety communication reception to the in-vehicle apparatus control block A23 of the in-vehicle apparatus 1 to the attention of the vehicle safety communication application (304), and transmits an in-vehicle apparatus screen output instruction to the screen input switching block 10 (305).

The in-vehicle apparatus control block A23 notifies the vehicle safety communication application (or starts it if it has yet to be activated) of the receipt of the vehicle safety communication, and transmits the result of the processing performed by the application to the screen input switching block 10. In turn, the screen input switching block 10 switches the screen information coming from the vehicle safety communication application on the in-vehicle apparatus to display output.

===Definitions for Application Enabling and Screen Switching===

Figure 4:
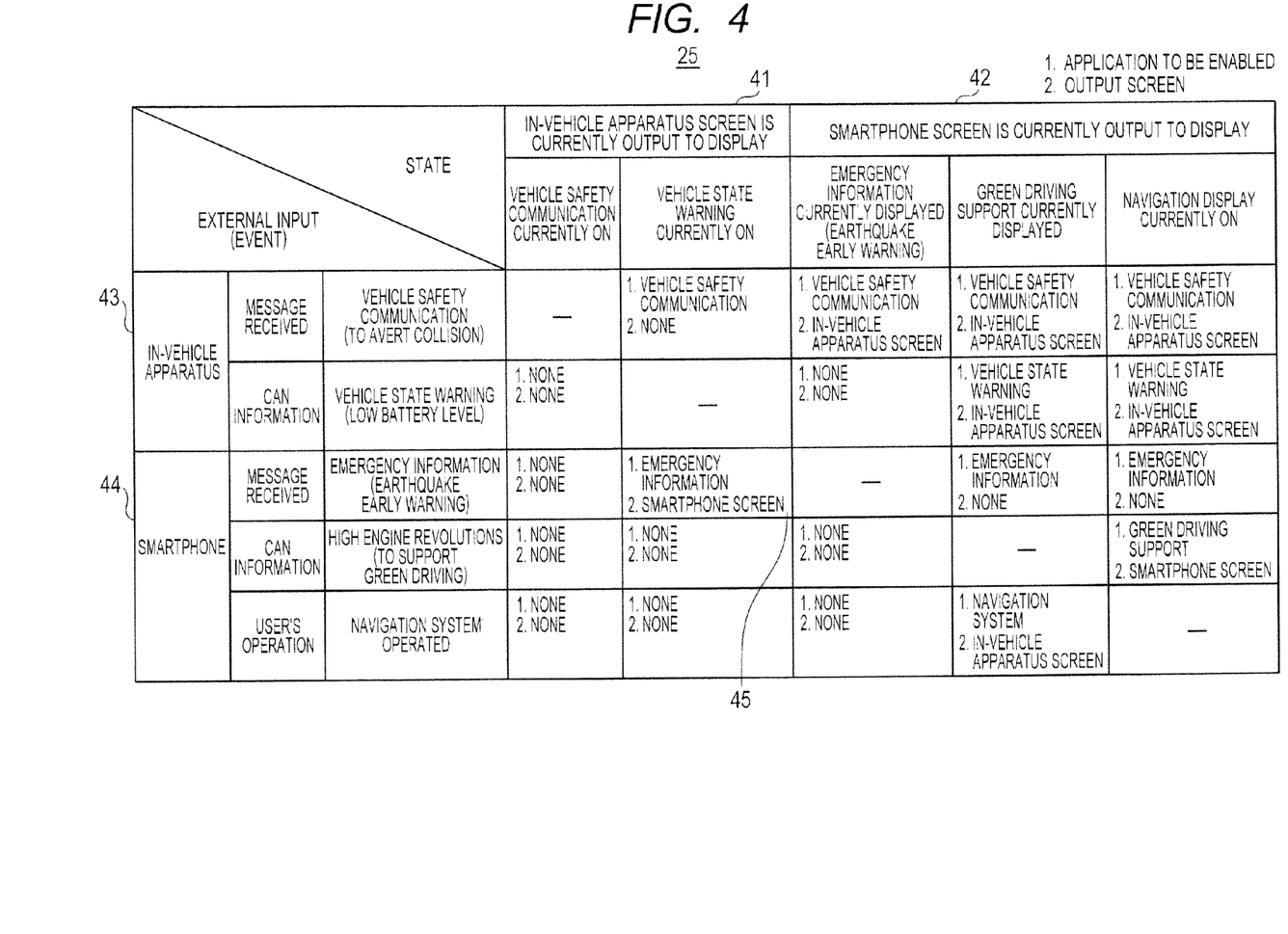
FIG. 4 is a tabular view listing typical definitions for enabling application programs of various embodiments and for switching screens accordingly.

FIG. 4 shows the definitions A25 for application enabling and screen switching. The definitions A25 vary in detail depending on the combination of applications to be used.

The definitions A25 for application enabling and screen switching are referenced by the application management block A22.

The items in the columns of the definitions A25 describe the state of the terminal screen currently output on the display (in-vehicle apparatus screen or smartphone screen) and the state of the application screen display (41 and 42). The items in the rows of the definitions (43 and 44) describe the external input from the in-vehicle apparatus 1 or from the smartphone 2 (receipt of a wirelessly transmitted message, receipt of CAN information, or user's operation). The combination of the screen display state 41 or 42 with the external input 43 or 44 determines what is indicated by a number "1" or "2" in each of the cells making up the table of the definitions A25 for application enabling and screen switching. The number "1" indicates the application to be enabled by the application management block A22, and the number "2" indicates the screen to which display output is switched.

For example, with the in-vehicle apparatus screen currently output (41) and with the screen of a vehicle state warning application currently displayed, the smartphone 2 may receive an emergency information message (e.g., earthquake early warning). In that case, the applicable cell (45) indicates that ("1.") the substance of the display is "emergency information" and that ("2.") display output is switched to the smartphone screen.

As explained above, where an application (A) carried by the in-vehicle apparatus of this embodiment is currently operating and outputting its screen, if the external input reception block A21 detects an event requesting the enabling of an application (B) carried by the smartphone 2 and having a higher priority than the application (A), then the in-vehicle apparatus enables the application (B), displays the smartphone screen, and switches the display output screen to the smartphone output screen.

Upon switching of the screens described above, it the screen input switching block 10 has a picture composite function for displaying the screen of the in-vehicle apparatus 1 and that of the smartphone 2 in picture-in-picture form, then the higher-priority apparatus output screen may be displayed in the main screen and the lower-priority apparatus output screen in the sub-screen.

As another alternative, if the screen input switching block 10 has a multi-window display function for displaying the screens of one or more applications of the in-vehicle apparatus 1 and the screens of one or more applications of the smartphone 2 in multi-window form, the screen of the highest-priority application may be controlled to be displayed as the active screen in the foreground.

As a further alternative, the screen input switching block 10 may not perform the above-described switching of screens and may display both the display output screen and the smartphone output screen.

===Application Attribute Definitions===

Figure 5:
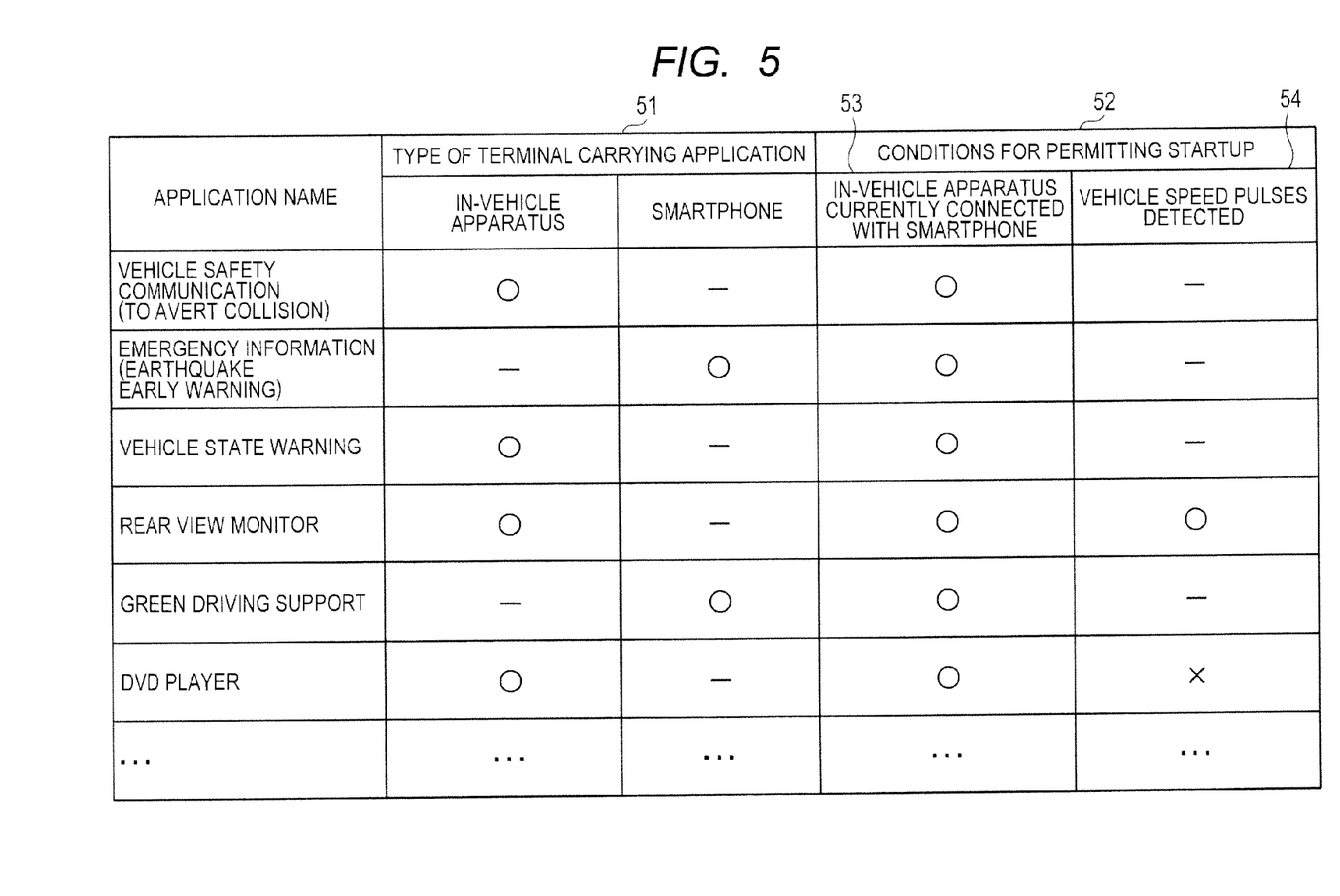
FIG. 5 is a tabular view listing typical definitions of application attributes for various embodiments.

FIG. 5 shows typical application attribute definitions. FIG. 5 is a table that manages the terminals associated with the names of the applications to be enabled (indicated by "1." in FIG. 4), as well as the conditions for allowing the applications to be enabled.

The definitions listed in FIG. 5 are referenced by the application management block A22.

The definitions include the name of each of the applications and the type 51 of the terminal (e.g., in-vehicle apparatus 1, smartphone 2) carrying each application, and the conditions 52 for allowing the application of interest to be enabled. Of the conditions 52 for permitting the enabling of applications, one (53) says "the in-vehicle apparatus is to remain coupled with the smartphone 2" and another (54) says "vehicle speed pulses are to be detected (while the vehicle is traveling)." A symbol (-) indicates it does not matter whether vehicle speed pulses have been detected, and a symbol (x) indicates the condition stipulating that vehicle speed pulses should not be detected.

The application management block A22 references the type 51 of the terminal carrying a given application, thereby giving a switching instruction to the screen input switching block 10 if the application in question is determined to be enabled.

The application management block A22 references the enabling permitting conditions 51 to extract the application that can be enabled under each of the conditions, and references the definitions A25 for application enabling and screen switching corresponding to the state of each condition. That is, the names of the applications of which the attribute definitions are listed in FIG. 5 correspond to the enabled applications (indicated by "1." in FIG. 4) on a one-to-one bases. Also, the application attribute definitions in FIG. 5 make up a table for referencing the definitions A25 for application enabling and screen switching, and are stored in association with the definitions A25 for application enabling and screen switching listed in FIG. 4.

As explained above, this embodiment makes it possible to enable the application suitable for both the vehicle state acquired via the CAN interface and the state of coupling between the vehicle and the smartphone 2, and to switch screen display and display output screen.

Second Embodiment

Configuration Diagram 1

Figure 6:
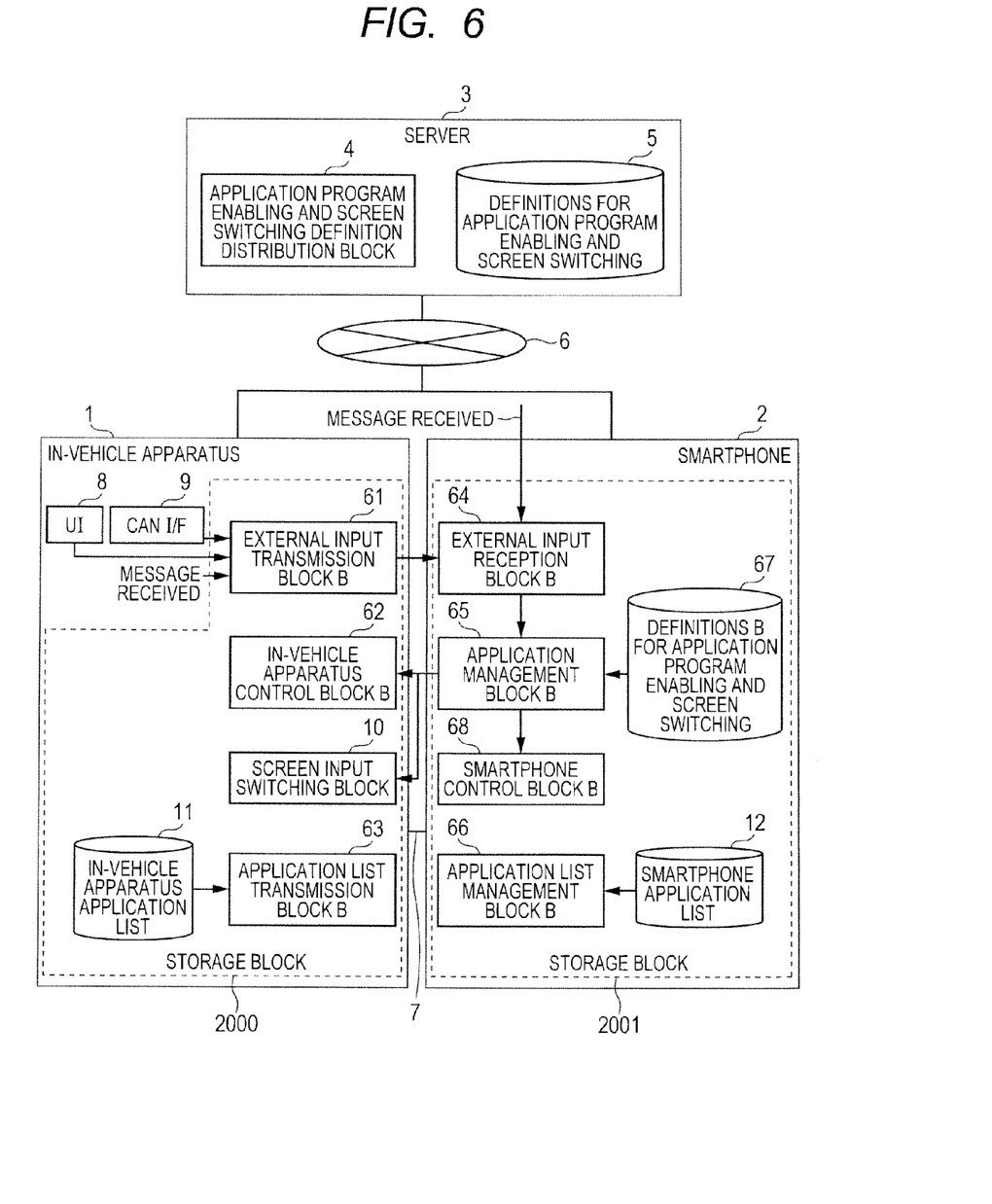
FIG. 6 is a block diagram showing a typical configuration of a display control system and a terminal as a second embodiment.

FIG. 6 is a configuration diagram showing the second embodiment in which an application management block B65 is located on the side of a terminal (smartphone 2) external to the in-vehicle apparatus 1.

The smartphone 2 includes an external input reception block B64, an application management block B65, an application list management block B66, definitions B67 for application enabling and screen switching, a smartphone application list 12, and a smartphone control block B68. These components are stored in a storage block 2001.

The in-vehicle apparatus 1 includes an external input transmission block B61, an in-vehicle apparatus control block B62, a screen input switching block 10, an application list transmission block B63, and an in-vehicle apparatus application list 11. These components are stored in a storage block 2000. The in-vehicle apparatus 1 is also furnished with a user interface (UI) 8 and a CAN interface (I/F) 9.

===Enabling of Applications and Switching of Screen Output on the In-Vehicle Apparatus by the Smartphone===

Figure 7:
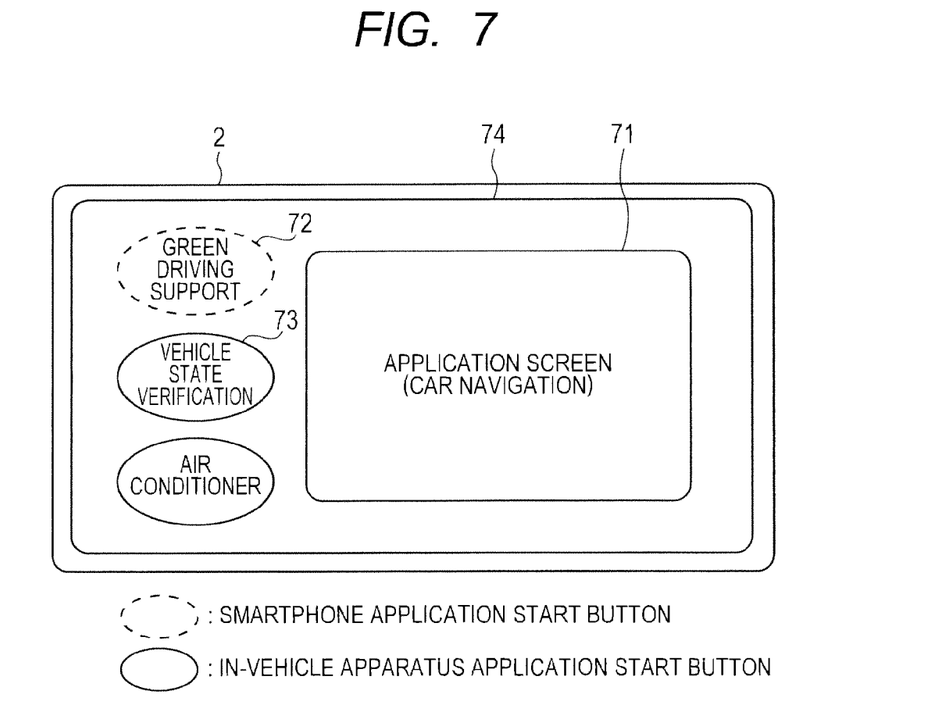
FIG. 7 is a schematic view showing a typical screen display on an in-vehicle apparatus of the second embodiment.

FIG. 7 shows an output screen 74 of the application management block B65.

Shown on the left side of the screen are a button 72 for enabling an application of the smartphone 2 and a button 73 for enabling an application of the in-vehicle apparatus 1. On the right side of the screen appears a screen 71 of the application currently executing on the smartphone 2.

The application enabling buttons 72 and 73 shown on the left side of the screen are each used to display a group of applications selected according to the above-described conditions for permitting application enabling.

This output screen 74 is transmitted to the in-vehicle apparatus 1 via a wired communication channel such as USB or composite or via a near-field wireless communication channel. When the user operates the touch panel or hardware buttons of the in-vehicle apparatus 1, the in-vehicle apparatus 1 transmits corresponding control signals to the smartphone 2 for control of the smartphone screen.

===When the Application Management Block is Located on the Smartphone Side and the User Enables an In-Vehicle Apparatus Application===

Figure 8:
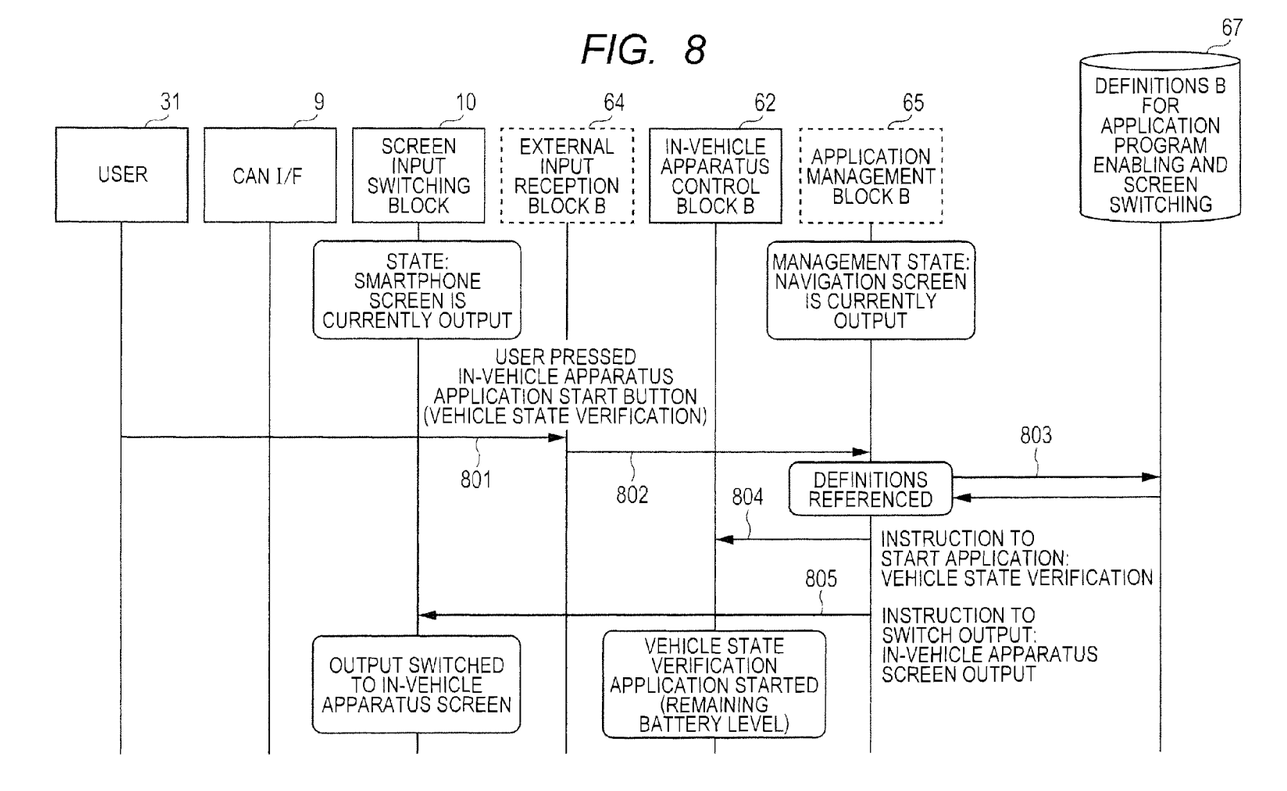
FIG. 8 is a sequence diagram showing the sequence of the second embodiment.

FIG. 8 shows the typical sequence in effect when the smartphone screen currently output is switched to the output of the in-vehicle apparatus screen, in the configuration of FIG. 6 in which the application management block B65 is located in the smartphone 2.

It is assumed here that the smartphone control block B68 of the smartphone 2 starts a navigation application carried by the smartphone 2 and transmits the result of the processing by the activated application to the screen input switching block 10 of the in-vehicle apparatus 1 and that the screen input switching block 10 outputs smartphone screen information to the display.

The external input reception block B64 detects that the user has pressed the in-vehicle apparatus application enabling button (801) to request the enabling of a vehicle state verification application (e.g., to verify the remaining battery level). The external input reception block B64 transmits the detected event to the application management block B65 (802).

Upon receipt of the detected event, the application management block B65 references the definitions B67 for application enabling and screen switching to determine that the application whose screen display needs to be enabled is the vehicle state verification application, and identifies the in-vehicle apparatus 1 as the apparatus carrying the application in question (803).

The application management block B65 transmits to the in-vehicle apparatus control block B62 of the in-vehicle apparatus 1 an instruction to enable the vehicle state verification application (804), and transmits an in-vehicle apparatus screen output instruction to the screen input switching block 10 (805).

The in-vehicle apparatus control block B62 enables the vehicle state verification application (or starts it if it has yet to be activated). The screen input switching block 10 switches the in-vehicle apparatus screen information output from the vehicle state verification application to display output.

===Updating of the Definitions for Application Enabling and Screen Switching===

Figure 10:
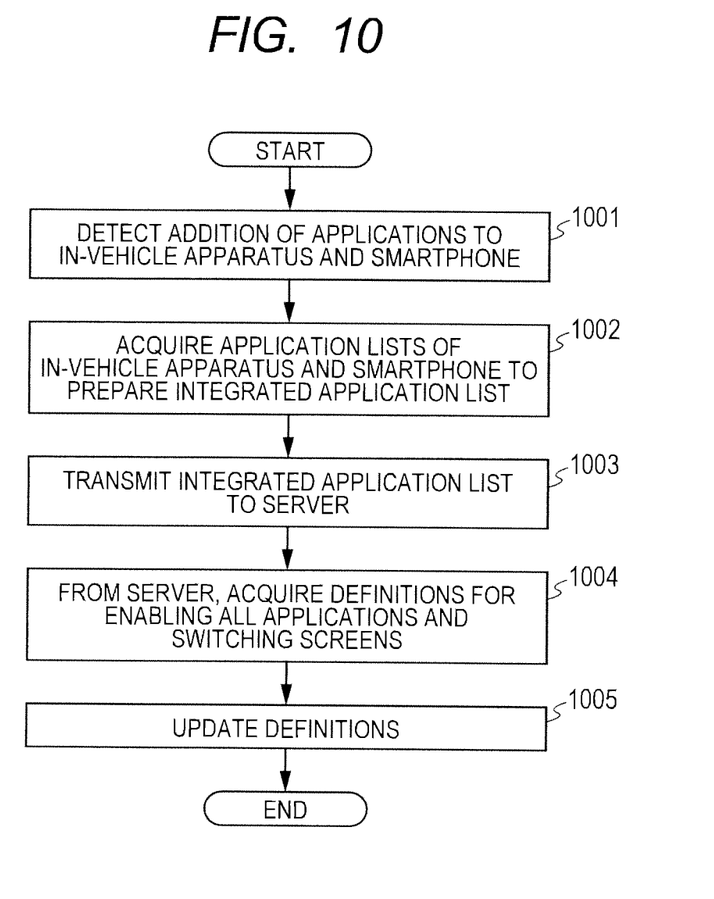
FIG. 10 is a flowchart explaining a typical control flow of each embodiment.

FIG. 10 is a flowchart showing steps in which the application management block A22 or B65 updates or acquires the definitions (25 or 67) for application enabling and screen switching.

It is assumed here that on each of the terminals, the application lists (11 and 12) are updated whenever an application is added or deleted.

The application management block A22 or B65 detects that an application is added or deleted to or from the in-vehicle apparatus 1 or smartphone 2 (step 1001). For example, upon startup, the application management block A22 or B65 detects the addition or deletion of an application by comparing the previous application lists with those in effect upon startup or by comparing their hash values between the two points in time. As another example, the application management block A22 or B65 may detect coupling of the smartphone 2 with the in-vehicle apparatus 1.

The application management block A22 or B65 acquires the application list of the in-vehicle apparatus 1 and the application list of the smartphone 2 and merges the two lists into an integrated application list that is updated (step 1002). The application management block A22 or B65 then transmits the updated integrated application list to the server 3 (step 1003). The server 3 transmits to the application management block A22 or B65 of the in-vehicle apparatus 1 or smartphone 2 new definitions 5 for application enabling and screen switching corresponding to the combinations of the application ID's listed in the received integrated application list (step 1004). Given the transmitted definitions 5 for application enabling and screen switching, the application management block A22 or B65 updates the definitions 25 or 67 for application enabling and screen switching accordingly (step 1005).

According to the updating method described above, when an application is added or deleted to or from the in-vehicle apparatus 1 or smartphone 2, or even when the user couples the smartphone 2 to an in-vehicle apparatus that carries applications different from those of the smartphone 2, it is possible to output display screens that offer higher safety and more convenience than ever.

What is claimed is:

1. An information processing apparatus having a display configured to display a result of execution by an application program, comprising:
   a screen switch definition information storing memory which is configured to store a screen switching definition information for determining whether switching information is displayed on the display or not, in case the information processing apparatus is connected to another apparatus;
   a display controller which is configured to switch the information displayed on the display according to the screen switching definition information stored in the screen switching definition information storing memory; and
   a management controller which is configured to manage a list of applications carried in the information processing apparatus and the another apparatus;
   wherein, upon updating the list of applications, the management controller is configured to acquire a new screen switching definition information,
   wherein, upon receipt of a new event by the information processing apparatus or the another apparatus from an external source via a wireless network, the display controller is configured to switch the information displayed on the display based on a combination of a state of the display and the external source according to the new screen switching definition information to account for prioritization of the applications,
   wherein the information processing apparatus is configured to be coupled with a server apparatus;
   wherein the management controller is configured to transmit an updated list of applications to the server apparatus, and
   wherein the display controller is configured to acquire from the server apparatus the new screen switching definition information corresponding to the updated list of applications,
   wherein, upon starting of the information processing apparatus or upon determining that the information processing apparatus or the another apparatus has added an application or has deleted an application, the management controller is configured to transmit the updated list of applications to the server apparatus.

2. The information processing apparatus according to claim 1,
   wherein, upon receipt of the new event, either the information processing apparatus or the another apparatus is configured to notify the management controller of the receipt of the new event;
   wherein, upon notification of the receipt of the new event from either the information processing apparatus or the another apparatus, the management controller is configured to determine which of the information processing apparatus and the another apparatus processes the new event, and
   wherein the management controller is configured to provide notification of the receipt of the new event to either the information processing apparatus or the another apparatus.

3. The information processing apparatus according to claim 2, wherein, when processing of the new event has yet to be started, the display controller is configured to initiate processing of the new event.

4. The information processing apparatus according to claim 1, wherein the new event received from the external source is at least one of an operation performed by a user, vehicle information, and a message received via a communication link.

5. The information processing apparatus according to claim 1,
   wherein the information processing apparatus is configured to couple to the another apparatus,
   wherein a management controller in the another apparatus is configured to manage definitions for either enabling or disabling an application in accordance with a state of coupling with the another apparatus and with a traveling state of a vehicle incorporating the information processing apparatus;
   wherein the management controller is configured to select an application that can be enabled based on the definitions for the enabling or the disabling of the application in the another apparatus, on the state of coupling with the another apparatus, and on the traveling state of the vehicle incorporating the information processing apparatus, and
   wherein the management controller in the another apparatus displays on the display an interface for enabling the selected application.

6. A method for information processing using an information processing apparatus, the method comprising:
   displaying, via a display, a result of execution by an application program;
   storing a screen switching definition information for determining whether switching information is displayed on the display or not, in case the information processing apparatus is connected to another apparatus;
   switching, via a display controller, the information displayed on the display according to the screen switching definition information; and
   managing a list of applications carried in the information processing apparatus and the another apparatus;
   upon updating the list of applications, acquiring a new screen switching definition information, and
   upon receipt of a new event by the information processing apparatus or the another apparatus from an external source via a wireless network, switching the information displayed on the display based on a combination of a state of the display and the external source according to the new screen switching definition information to account for prioritization of the applications,
   wherein the information processing apparatus is configured to be coupled with a server apparatus, and wherein the method further comprises transmitting an updated list of applications to the server apparatus, and acquiring from the server apparatus the new screen switching definition information corresponding to the updated list of applications, wherein, upon starting of the information processing apparatus or upon determining that the information processing apparatus or the another apparatus has added an application or has deleted an application, the method further comprises transmitting the updated list of applications to the server apparatus.

7. The method according to claim 6, further comprising:

upon receipt of the new event, providing a notification of the receipt of the new event via one of the information processing apparatus and the another apparatus; and upon notification of receipt of the new event from either the information processing apparatus or the another apparatus, determining which of the information processing apparatus and the another apparatus processes the new event, and providing notification of the receipt of the new event to the other of the information processing apparatus and the another apparatus.

8. The method according to claim 7, wherein, when processing of the new event has yet to be started, the method further comprises initiating processing of the new event.

9. The method according to claim 6, wherein the new event received from the external source is at least one of an operation performed by a user, vehicle information, and a message received via a communication link.

10. The method according to claim 6, further comprising:

coupling the information processing apparatus with the another apparatus;

managing, by the another apparatus, definitions for either enabling or disabling an application in accordance with a state of coupling with the another apparatus and with a traveling state of a vehicle incorporating the information processing apparatus;

selecting an application that can be enabled based on the definitions for the enabling or the disabling in the another apparatus, based on the state of coupling with the another apparatus, and based on a traveling state of the vehicle incorporating the information processing apparatus, and displaying in the another apparatus an interface for enabling the selected application.

\* \* \* \* \*